(12) United States Patent  
Xie et al.

(10) Patent No.: US 8,377,542 B2
(45) Date of Patent: Feb. 19, 2013

(54) FLEXIBLE PAD FOR ADHESIVE BONDING AND PREFERENTIAL RELEASE DIRECTION

(75) Inventors: Tao Xie, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/023,608

(22) Filed: Feb. 9, 2011

(65) Prior Publication Data

US 2012/0202035 A1    Aug. 9, 2012

(51) Int. Cl.
*B32B 9/00* (2006.01)
*B32B 33/00* (2006.01)
*B32B 7/12* (2006.01)
*B32B 15/04* (2006.01)

(52) U.S. Cl. .......... 428/166; 428/40.1; 428/343; 428/67
(58) Field of Classification Search ............. 428/40.1, 428/99, 105, 107, 113, 343, 354, 295.1, 295.4, 428/297.4, 298.1, 166, 914, 915, 916, 67, 428/200, 202, 41.8
See application file for complete search history.

(56) References Cited

U.S. PATENT DOCUMENTS

| 2,750,315 | A | * | 6/1956 | Tierney | ............ 428/295.4 |
| 3,100,160 | A | * | 8/1963 | Korpman | ............ 442/151 |
| 2008/0257485 | A1 | | 10/2008 | Xie et al. | |
| 2008/0257486 | A1 | | 10/2008 | Xie et al. | |

OTHER PUBLICATIONS

Ruomiao Wang et al., Viscoelastic Behavior and Force Nature of Thermo-Reversible Epoxy Dry Adhesives;Macromolecular Rapid Communications 2010, 31, 295-299; Macromolecular Journals; DOI: 10.1002/mar.200900594.

* cited by examiner

*Primary Examiner* — Catherine A Simone
(74) *Attorney, Agent, or Firm* — Reising Ethington P.C.

(57) ABSTRACT

Adhesive structures are disclosed which enable easy release of a strongly adherent dry adhesive pad or film. The adhesive pads or films are fabricated into structures or composites which exhibit a directional flexural modulus due to the incorporation of a plurality of spaced-apart, aligned, elongated reinforcements. The adhesive structure or composite will adhere strongly when loaded along the direction of the highest flexural modulus but release more readily when loaded along the direction of lowest flexural modulus.

4 Claims, 3 Drawing Sheets

FLEXIBLE PAD FOR ADHESIVE BONDING AND PREFERENTIAL RELEASE DIRECTION

TECHNICAL FIELD

This invention pertains to flexible polymeric pads with a releasable adhesive surface for bonding to a first article, the pads having an opposing surface adapted to carry, or to be carried by, another article while the pad is bonded to the first article. The flexible pads have embedded, aligned, linear reinforcing elements that stiffen the pads and render them difficult to peel from the first article in one direction, but easy to flex and peel in a direction transverse to the aligned reinforcing elements.

BACKGROUND OF THE INVENTION

There is a need for means to adhesively attach a surface of an article to another surface in a manner in which the article can be easily peeled from the surface in one direction but is resistant to release from the surface by peeling in another direction. For example, it may be desired to temporarily suspend an article from a wall or other structural surface with an adhesive pad with the intent that it be firmly bonded to the wall or structural surface, but easy to remove when desired. In another example, there are applications in which an article could be lifted and carried using a pad that is bonded to the article with an adhesive surface. Later, when the article has been transported, the pad should be easy to remove from the re-located article.

SUMMARY OF THE INVENTION

A flexible pad is provided that may be formed of an adhesive, rubber-like, polymeric composition. The adhesive material is formulated to suitably bond to an intended wall or other supporting surface, or to bond to a surface of an article to be lifted using the pad. Other such temporary adhesive bonding applications can easily be developed. The adhesive bonding is intended to remain for a desired period of time, and later released. The opposing surface of the pad may be adapted to carry some article to be attached to the supporting surface, or to enable the lifting of an article to be moved. In some embodiments of the invention, the opposing surfaces of the pad may be parallel. But the shapes of the pads' surfaces are defined by the surfaces that they engage. By way of example, the thickness of the pad may range in thickness from about a micrometer to about 2 millimeters.

In practice of the invention, an entire pad may be formed of the dry adhesive material since the properties of the adhesive are suited to provide other strength and flexibility functions of the pad. The plan view or outline shape of the flexible pad is defined by the task that it is to serve. In many applications the pad may be rectangular or round. And a surface of the pad will have an adhesive contact area that provides a suitably strong bond with the surface to which the pad is applied. While the period of attachment may be short or long, it is intended that the pad and any attached articles will eventually be peeled from the surface to which it is adhesively attached. While the pad is adhesively bonded to a surface there will be a direction within its outline shape and in which it is preferred to resist easy removal of the pad from the surface to which it is attached. And there will be a transverse direction within the outline shape of the pad in which it is desired to easily grasp and pull the pad to break the adhesive bond.

In accordance with embodiments of this invention, a plurality of aligned, linear, spaced, reinforcing elements are embedded in the body of the flexible pad so as to stiffen the flexible pad in the direction for difficult removal from the surface to which it is attached. But the aligned reinforcing elements do not significantly resist flexing and peeling of the pad in the direction selected for its easy removal from the surface to which it is attached.

The reinforcing elements may, for example, be wires, rods, bands, or the like, of lengths (across the area of the pad) and diameters for serving their stiffening function, when they are aligned and embedded in the adhesive pad, to force selective directional removal of the pad from a surface to which its adhesive bonds it.

Separating adhesively-joined articles may be accomplished by loading the joint in peel or in shear. When at least one of the joined articles is compliant, peel loading may be employed. Peel is accomplished by first lifting an edge of the compliant article to locally separate the articles and form an opening, and then, by continued loading at an angle to the adhesive-formed surfaces, progressively advancing the opening across the joint to completely separate the articles. When both articles are stiff or substantially rigid, they may be separated by loading them in shear in the plane of the joint. Lower joint strengths are observed when the joint is loaded in peel.

This reduced bond strength in peel, may usefully be employed with releasable adhesives. If the adhesive is intended to be reusable, in addition to releasable, the adhesive will preferably remain fully attached to one of the workpieces and leave no residue on the other workpiece.

A suitable reusable and releasable dry adhesive may rely on interacting with the workpiece through noncovalent molecular interactions, such as, for example, van der Waals forces. Such a dry adhesive may be a compliant elastomeric epoxy, formed, for example, by reaction of an aliphatic diepoxy with a diamine curing agent. Such a compliant elastomeric epoxy, when first brought into contact with a workpiece will deform locally and generally conform to surface inegularities and contours in the workpiece to bring the workpiece and adhesive into intimate contact over substantially the entire contact area. On peeling the workpieces apart, even a small separation between workpiece and adhesive will markedly reduce the adhesive strength of the bond and enable ready removal of one workpiece from another.

The peel strength of an adhesive joint may be manipulated by varying the peel angle, the angle made by one workpiece with the other as the workpieces are separated—the greater the peel angle, the less the peel force. The peel angle largely depends on the compliance or stiffness of the workpieces with stiff or low-compliance workpieces enforcing a small peel angle while flexible or compliant workpieces enable a high peel angle and a low peel force.

An object of this invention is a body incorporating a releasable adhesive pad, or layer, in which the force required to detach the adhesive pad, or layer, varies with direction in the plane of the adhesive bond. This may be achieved by reinforcing the adhesive pad or layer with directionally-aligned reinforcements adapted to develop i) a stiff, low compliance release direction and ii) a flexible, compliant release direction. In general the release directions are transverse to each other. In its stiff, low-compliance, release direction the peel angle for the adhesive will be small and the peel force correspondingly high. In its flexible or compliant release direction the peel angle will be higher, resulting in a lower peel force. It will be appreciated that the adhesive pad may be of any plan-view shape including, but not limited to, a regular polygon, a circle, or the pad may be of irregular shape.

When the workpiece is sufficiently rigid that peel is inhibited, separation may be achieved by loading the joint in shear.

The oriented elongated reinforcements will similarly influence the shear strength of the joint. There will therefore be a direction in which the joint exhibits a maximum shear strength and a direction, generally perpendicular to the maximum shear strength direction, in which the shear strength is a minimum. Hence, in service, the pad may be oriented so that the shear load is directed along the high shear strength direction but more readily removed by shearing in the low shear strength direction.

The reinforcements, appropriately scaled to the thickness of the adhesive layer, may be incorporated directly in the adhesive. Such reinforcements may include a plurality of aligned elongated structural members which may include fibers, rods, tubes or narrow rectangular plates. The aligned structural members may act independently but will preferably be present in suitable density to cooperatively reinforce one another when loaded along a particular direction or some narrow angular range disposed about that direction.

Thus, in one illustrative embodiment, if one tries to peel the adhesive in the direction of the aligned reinforcement they resist bending and removal is difficult. But, if the pad is peeled in the transverse direction the reinforcements are rolled and release is easier.

The composite adhesive-structure combination formed by the adhesive and embedded reinforcement will exhibit directionally-varying compliance in the plane of the adhesive bond leading to a directionally-varying release strength. Such a composite adhesive pad or layer may beneficially be employed in devices and mechanisms in which high adhesive strength in at least one direction, coupled with ease of detachment in another direction is desirable.

One exemplary embodiment incorporating such a releasable adhesive pad may be a removable hook structure. The hook structure may comprise a planar pad of releasable adhesive for attachment to, for example, a wall, or other suitable, vertical or near-vertical surface. The hook structure which engages the adhesive pad may be rigid in the direction in which the hook, in service, would be loaded. Due to this rigidity of the hook structure in the loading direction the peel angle would be small and the peel strength would be high. Thus, if a safe working load was not exceeded, the hook would remain attached. If however the hook structure engaging the adhesive pad was compliant in a direction generally orthogonal to the loading direction the peel strength would be low and application of only limited load in this direction would be required to peel the adhesive pad and release the hook from the generally vertical surface.

Another exemplary embodiment for such a releasable adhesive pad may be a releasable gripper pad. Such a pad may be employed, for example, in a pick and place operation in which an article is picked up at one location and transported, for example by a robot, overhead conveyor or similar device to another location, and released. A structure whose compliance varies with loading direction may be integrated with the gripper pad. The article may be securely picked up and transported by ensuring that all inertial loads are directed along the low-compliance axis of the gripper structure which is characterized by high peel strength. Once positioned, the article may be readily released by applying a peel force along the compliant, low peel strength axis of the gripper structure.

Other objects and advantages of the invention will be apparent from a description of preferred embodiments which follows in this specification.

DESCRIPTION OF PREFERRED EMBODIMENTS

Figure 1:
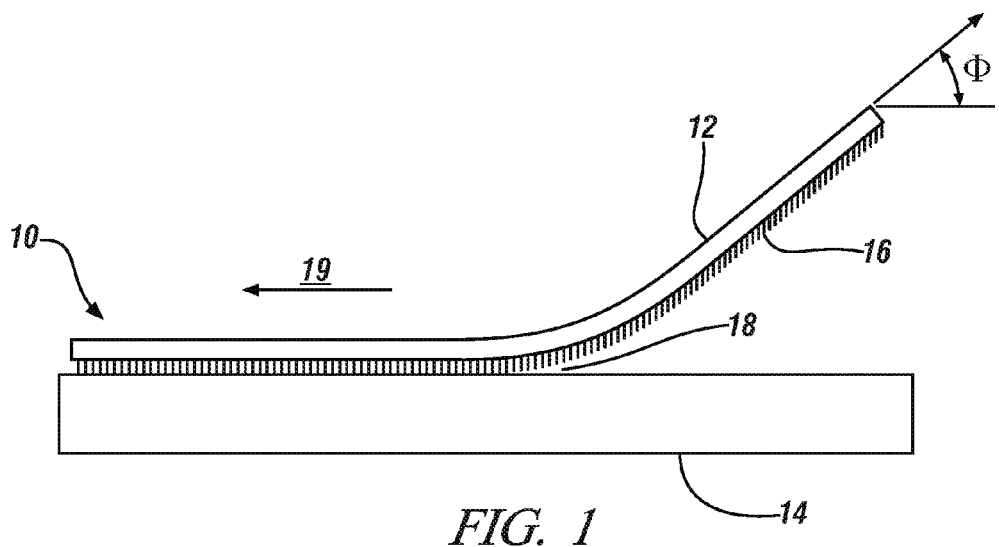
FIG. 1 shows, in side view the geometry of an adhesive joint loaded in peel.

FIG. 1 illustrates an adhesive joint 10 formed between workpieces 12 and 14 by adhesive 16 under peel loading by a load P applied along a direction inclined at an angle $\Phi$ to the plane of the adhesive joint. Application of the load has opened up a crack 18 between adhesive 16, shown as still bonded to workpiece 12, and workpiece 14, and continued application of load P will cause crack 18 to propagate in the direction of arrow 19, leading to the eventual separation of workpieces 12 and 14.

The mechanics of this process, assuming that negligible plastic deformation occurs in workpieces 12 and 14, may be represented by the equation:

$$P(1-\cos \Phi) = \Gamma_o.$$

where
P=Peel force per unit length
$\Phi$=Peel angle
and $\Gamma_o$=Work of adhesion
=Adhesion energy per unit area which is valid for all loads which apply shear stresses to the joint which are less than the shear strength of the joint.

Conventional approaches to releasable adhesives have focused on adhesives which exhibit a low work of adhesion ($\Gamma_o$). This approach, while it facilitates release of the adhesive necessarily also limits the load-carrying capability of a joint. Hence, the use of low work of adhesion adhesives may limit the use of such releasable adhesives to applications, typically non-structural applications, where such low adhesive strength may be tolerated.

The inventors have appreciated that it is feasible to employ high adhesive strength adhesives in a releasable manner by enabling, in at least one direction, a high peel angle, and, in at least a second direction, enabling a low peel angle.

For a given adhesive and workpiece combination, that is, when $\Gamma_o$ is fixed, increasing the peel angle, $\Phi$, leads to reduced peel force. Thus separating workpieces 12 and 14 is most readily accomplished using a large peel angle. However the obtainable peel angle depends on the compliance of workpiece 12 or, the extent to which workpiece 12 will bend under load, and therefore, will depend on the bending or flexural modulus of workpiece 12. If workpiece 12 is very thin, such as a tape, it will behave similarly to a membrane and will exhibit only a negligible flexural modulus so that it may be bent completely back on itself and exhibit a peel angle of about 180° to exhibit the lowest peel force. However if workpiece 12 has a very high flexural modulus, it will bend only minimally, resulting in a low peel angle and, consequently, a much larger peel force. Thus, the peel force for an adhesive joint may be controlled, in the configuration shown, by the flexural modulus of the workpiece 12.

In the configuration shown in FIG. 1, the flexural modulus and peel strength depends on the stiffness of the workpieces 12 and 14, but in many applications where releasable adhesives are employed the adhesive may be in the form of a layer or pad which may be permanently attached to a backing plate or other supporting structure. Such an adhesive structure may combine a high adhesive force and a low release force if the adhesive pad or its supporting structure is constructed and arranged to provide a directionally-varying flexural modulus.

Figure 2:
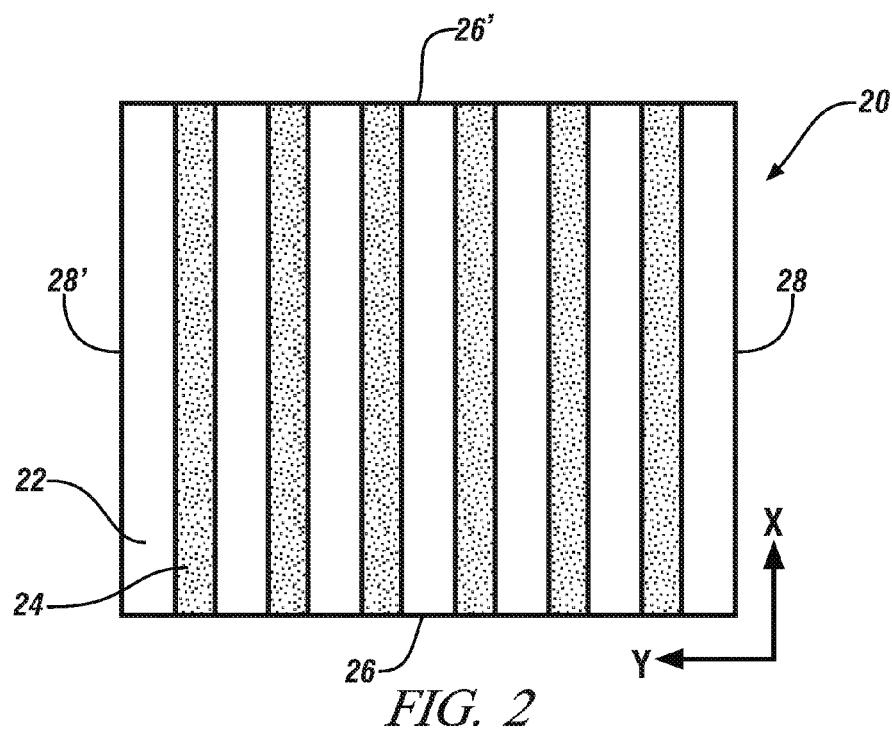
FIG. 2 illustrates, in plan view, a pad of releasable adhesive material, in which have been incorporated aligned longitudinal reinforcing structures.
Figure 3:
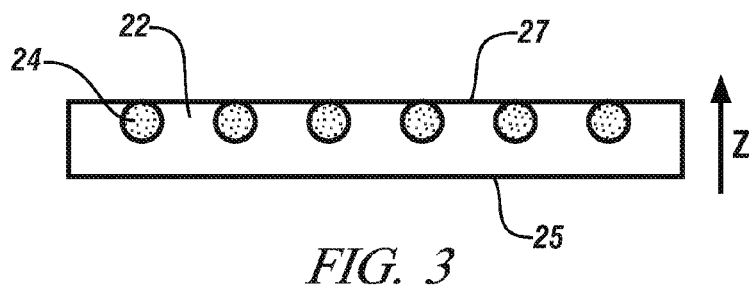
FIG. 3 illustrates in side view the releasable adhesive pad shown in FIG. 2.

An example of a composite adhesive pad structure with directionally-varying flexural modulus is shown in FIGS. 2 and 3. These show, in plan and side view respectively, an adhesive pad 20 with adhesive surface 25, comprising adhesive 22 with aligned, equally-spaced reinforcing features 24 incorporated and embedded into the adhesive pad 20 and aligned with the indicated 'X' axis. Such embedment may be accomplished during the working period of the epoxy adhesive, that is, after addition and mixing of curing agent, but before appreciable polymerization has occurred. Obviously the relative thickness of pad 20 and reinforcing features 24 must be appropriately selected to achieve the configuration shown.

With this configuration, the flexural modulus of a load applied along edge 26 or edge 26' will be substantially equal to the area-weighted average of the moduli of reinforcing features 24 and adhesive 22. For a load applied along edge 28 or 28', however, the flexural modulus will approximate that of the adhesive 22 only. The composite flexural modulus will therefore be much higher for loadings along edge 26 than for loadings along edge 28.

Such a composite pad would exhibit high adhesive strength when loaded along edges 26 and 26', and such loading should be applied in service. But much lower adhesive strength, and easier release of the adhesive, would result if the composite pad were loaded along edges 28 and 28'.

The reinforcing features are depicted as commonly-dimensioned cylindrical rods in FIGS. 2 and 3, but the invention comprehends reinforcements with other cross-sections including oval, rectangular and irregular, as well as variably-sized reinforcements. Also the reinforcements may be hollow or tubular rather than solid. The reinforcements shown in FIGS. 2 and 3 are shown as regularly spaced, but irregularly-spaced reinforcements may also be employed.

The reinforcements of FIG. 3 are depicted as arranged in a common plane and closer to surface 27, opposing adhesive surface 25. This is a preferred configuration but more irregular, or alternate placement in the indicated 'Z' direction is acceptable. Preferably the thickness of adhesive 22 ranges from between about 1 micrometer and 2 millimeters with the reinforcement(s) scaled to occupy up to about 100% of the layer thickness.

An adhesive pad, such as shown in FIGS. 2 and 3, may also be employed to attach two very stiff, near-rigid articles to one another. These near-rigid bodies will not flex appreciably and substantially inhibit separation by peeling. In this circumstance, separation may be effected by shearing. The directional reinforcement will modify the shear strength is similar manner to the peel strength, enabling release under a high shear load in a direction aligned with the reinforcements and a under a lower shear load in a generally perpendicular direction.

Reinforcements need not be incorporated into the body of the adhesive pad, but may be mounted on, or attached to surface 27 (FIG. 3) opposing adhesive surface 25. Since one suitable adhesive is an elastomeric epoxy, it may be cast around or onto reinforcements to ensure robust attachment to the surface.

Figure 4:
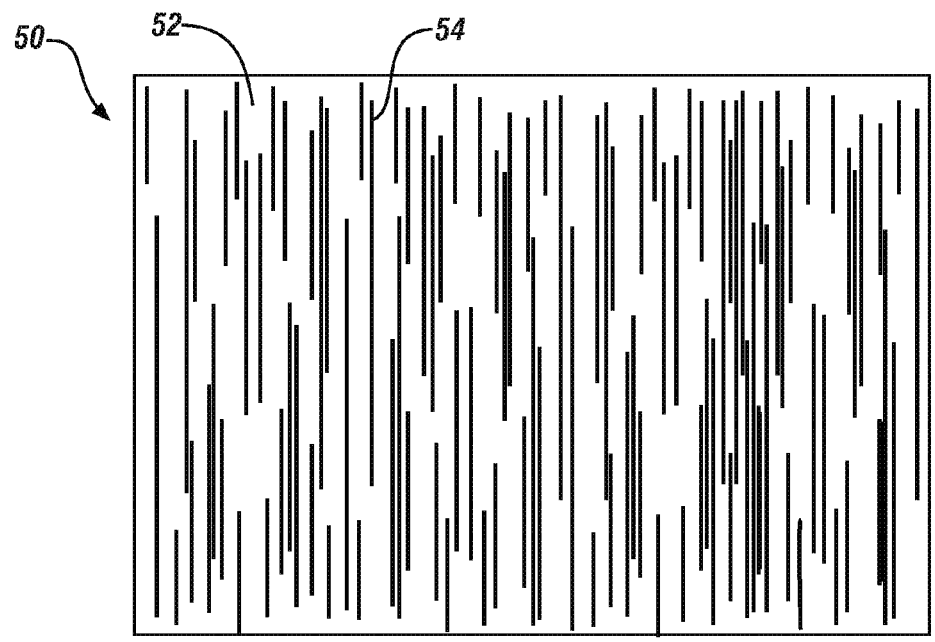
FIG. 4 illustrates, in plan view, a layer of releasable adhesive material, in which have been incorporated, aligned, chopped discontinuous reinforcing fibers.

In some applications only a thin film, generally less than 200 micrometers of adhesive may be employed. Such a thin film may similarly be selectively reinforced to induce a directional flexural modulus by introduction of oriented and aligned continuous or discontinuous (chopped) fibers. The reinforced adhesive film 50 shown in FIG. 4 incorporates a plurality of fibers 54 of varying lengths embedded in adhesive 52. The fibers are shown as chopped fibers, well-aligned but randomly placed and located. Other, more regular, fiber placements may also be used to confer the desired anisotropy in flexural modulus.

Figure 5:
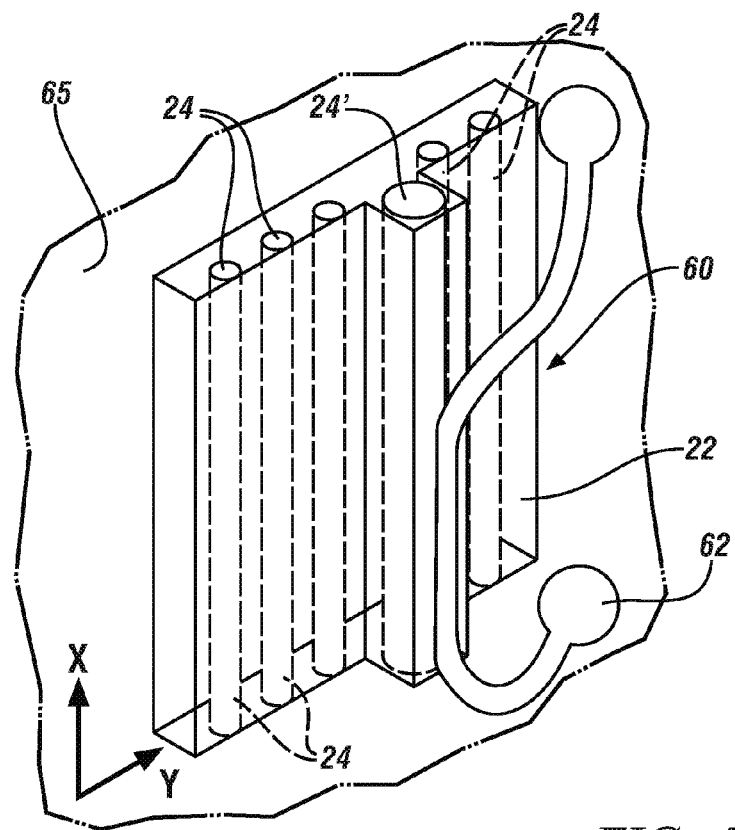
FIG. 5 illustrates, in perspective view, a hook, for attachment to a vertical or near vertical wall, incorporating aligned reinforcing longitudinal structures.

An exemplary embodiment of such a releasable adhesive structure is shown in FIG. 5 illustrating a load-carrying device 60 for releasable attachment to a vertical or near-vertical surface 65. The arrangement of the adhesive structure generally corresponds to that shown in FIGS. 2 and 3 in which an adhesive pad material 22 is reinforced by a series of elongated parallel reinforcements 24 with their long axes aligned with the 'X' direction of the device. Reinforcement 24', of greater cross-section than reinforcements 24, incorporates a load-carrying element 62, here depicted as a hook. But other load-carrying elements including, without limitation, brackets, braces or supports, may also be employed. To accommodate the larger cross-section of reinforcement 24', the thickness of adhesive layer 22 has been locally increased, but other configurations of adhesive and reinforcement, including a uniform adhesive layer thickness, may also be used.

Reinforcement 24' is aligned parallel to reinforcements 24 so that the flexural modulus of load-carrying device 60 will be high for loads applied along its 'X' axis but low for loads applied along its 'Y' axis. Thus, load-carrying device 60 may offer significant support to loads generally applied along its 'X' axis but be readily disengaged from the vertical or near-vertical surface by application of relatively modest loads applied generally parallel to its 'Y' axis.

Figure 6:
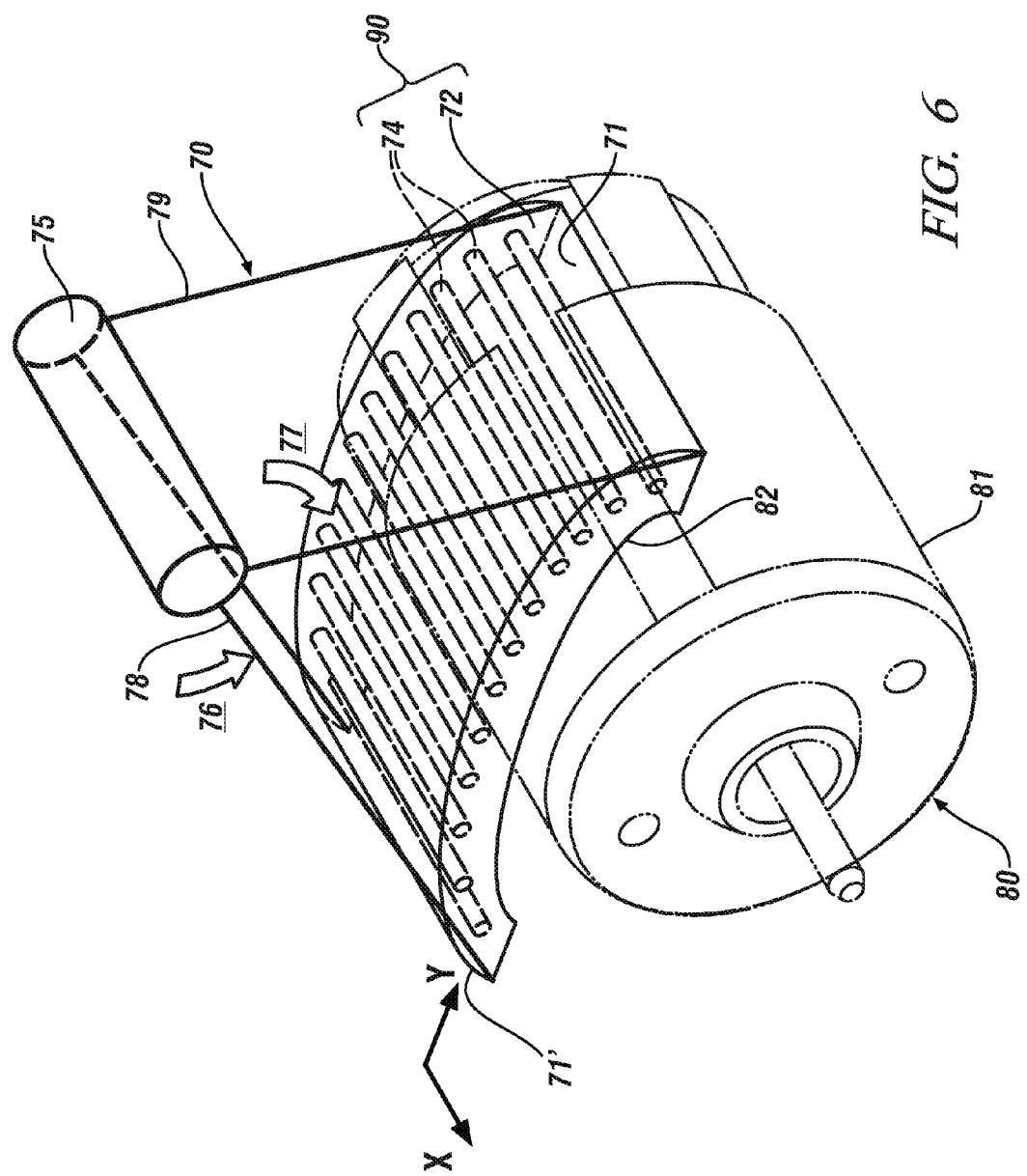
FIG. 6 illustrates, in perspective view, a gripper for controllably picking up and releasing an article.

In an aspect of the embodiment shown in FIG. 5, the reinforcements 24 and 24' may be embedded in a compliant but non-adhesive polymer and the polymer body, with incorporated reinforcements, attached to a coextensive, generally planar sheet of adhesive. To achieve an acceptably low compliance, and ease of peel, in the direction orthogonal to the reinforcements the polymer should be an elastomer. This approach offers opportunity to independently tailor the adhesive strength of the adhesive and the compliance range of the reinforcement. Also the properties of the reinforcement may readily be modified, for example by incorporation of additives such as fillers or coloring agents into the polymer, without compromising the adhesive properties of the structure A second exemplary, but not limiting, embodiment of such a releasable adhesive structure 70 intended for pick-up and release of articles is illustrated in FIG. 6. Structure 70 consists of a releasable adhesive body 90 consisting of adhesive 72 with generally-aligned reinforcements 74, lying parallel to the 'X' axis of the structure. The structure has a curved adhesive surface 82 and is intended for pick-up and release of an article with a curved surface, for example, casing 81 of generally-cylindrical electric motor 80. However, as shown, the curvature of adhesive surface 82 does not match the curvature of casing 81. But ends 71, 71' of adhesive 72 are attached to arms 78 and 79 which rotate about pivot 75. Upon rotation of arm 78 in the direction of arrow 76 and of arm 79 in the direction of arrow 77, for example under the action of an air cylinder or solenoid (not shown), the adhesive body 90 will be flexed and adopt the curvature of motor casing 81, thereby adhering structure 70 to motor 80.

Motion of structure 70, by conveyor, robot arm or similar device (not shown), and adhered motor 80 along its 'X' axis will direct inertia 1 forces along the high flexural stiffness/high adhesive force direction of adhesive body 90 to enable transport of motor 80.

When release of motor 80 is required arms 78 and 79 may be rotated, for example by reversing the motion of the solenoid or air cylinder or like device employed to flex arms 78 and 79 originally, in directions opposite those of arrows 76 and 77. This will apply peel forces to adhesive body 90 along its low flexural modulus direction 'Y' to enable separation of the adhesive 72 from casing 81.

Alternative means of securing motor 80, such as mechanical grips may be employed. But those skilled in the art will appreciate that the releasable adhesive approach described above may apply appreciably lower loads to motor casing 81 than the clamping loads required for secure retention using mechanical grips. Further, unlike mechanical grips which can only secure motor 80 if they extend over an angular range of at least 180°, an adhesive patch of much smaller angular extent may be employed. This may afford more flexibility of placement of the motor if automated assembly is considered.

Although the practice of the invention has been illustrated through reference to certain preferred embodiments; such embodiments are intended to be exemplary, and not limiting. The full scope of the invention is to be defined and limited only by the following claims.

The invention claimed is:

1. A flexible body of a dry adhesive composition with a thickness bordered by an edge, and having a surface for releasable adhesive attachment to a surface of another article, the flexible body further comprising a plurality of parallel, spaced-apart, linear, stiffening rods or tubes embedded in the adhesive body, the number and arrangement of the parallel rods or tubes being adapted to resist removal of the flexible body from the article surface by lifting, peeling or shearing in a direction parallel to the long axis of the rods or tubes but susceptible to removal by lifting, peeling or shearing in a direction generally transverse to the long axis of the rods or tubes.

2. The flexible body of claim 1 in which the thickness of the body ranges from between about 1 micrometer to about 2 millimeters.

3. The flexible body of claim 1 in which the embedded rods or tubes are located a common distance from the adhesive surface.

4. The flexible body of claim 1 when formed of an elastomeric epoxy.

* * * * *